United States Patent [19]
Garneau

[11] Patent Number: 5,614,964
[45] Date of Patent: Mar. 25, 1997

[54] UNITARY SPHERICAL FLEXIBLE EYEWEAR PANE HAVING TWO SEPARATE INDIVIDUALLY OPTICALLY COMPENSATING LENS ELEMENTS AND EYEWEAR FOR SPORTSMEN HAVING SUCH A PANE

[75] Inventor: Louis Garneau, St-Augustin-de-Desmaures, Canada

[73] Assignee: 9001-6262 Québec Inc., St-Augustin-de-Desmaures, Canada

[21] Appl. No.: 568,138

[22] Filed: Mar. 13, 1995

Related U.S. Application Data

[63] Continuation-in-part of Ser. No. 402,441, Mar. 13, 1995, abandoned.

[51] Int. Cl.$^6$ .............................. G02C 1/00; G02C 1/04
[52] U.S. Cl. .............................. 351/83; 351/41; 351/103
[58] Field of Search .............................. 351/41, 158, 47, 351/44, 86, 91, 92, 106, 159, 83, 103, 109

[56] References Cited

U.S. PATENT DOCUMENTS 4,867,550  9/1989  Jannard ........................ 351/44

*Primary Examiner*—Hung X. Dang
*Attorney, Agent, or Firm*—François Martineau

[57] ABSTRACT

The spherical flexible sheet lens is releasably secured to and within the channel of an eyewear frame. The lens defines two distinct lens elements and a bridge part spacedly integrally interconnecting the first and second lens elements. The bridge part includes a nose opening for free passage of the wearer's nose. A transverse lip forms the top of said lens to be inserted within the channel and secured to the frame. Each lens element: is of generally spherical shape; is thickest in its center portion and gradually thinner towards its edgewise portion to control the optical distortion brought about by a curved plastic lens; is adapted to register with a corresponding one of the two eyes of a wearer; defines an interior surface in facing register with the wearer's face and an exterior surface; includes an inturned web interconnecting the top and inner sides of each lens element to the lip and bridge part, respectively, the lens element being outwardly offset relative to said lip and bridge part.

15 Claims, 6 Drawing Sheets

UNITARY SPHERICAL FLEXIBLE EYEWEAR PANE HAVING TWO SEPARATE INDIVIDUALLY OPTICALLY COMPENSATING LENS ELEMENTS AND EYEWEAR FOR SPORTSMEN HAVING SUCH A PANE

CROSS-REFERENCE DATA

This application a continuation-in-part of U.S. patent application 08/402,441 filed on Mar. 13, 1995, now abandoned by the present applicant.

FIELD OF THE INVENTION

This invention relates to sporting gear eyewear, and more particularly to an unitary spherical flexible lens eyewear for sportsmen.

BACKGROUND OF THE INVENTION

U.S. design Pat. No. 268,683 issued Apr. 19, 1983 to the American Optical corporation (inventor: Dale TENNY) discloses an eyewear including a main frame, a pair of lenses carried spacedly from one another by the main frame, and a pair of ear stems projecting from and pivotally carried by the opposite lateral ends of the main frame. Each of the two lenses is toroidal, i.e. arcuate about both a vertical axis and a horizontal axis with different radii of curvature. The main frame includes an intermediate bridge part, separating the two lenses, with the bridge part being generally flat about at least the horizontal axis. The edges of each lens are completely circumscribed by the main frame.

U.S. utility Pat. No 4,867,550 issued Sep. 19, 1989 to Oakley, inc. (inventor: James JANNARD, hereafter patent JANNARD '550) discloses a unitary transparent lens for use in eyeglasses. The lens includes a first eye pane and a second eye pane, which are located directly in front of the wearer's right and left eyes, respectively, and are merged together with a unitary bridge portion. This single lens is premolded to be toroidal, with each of the vertical and horizontal axes having a different radius of curvature which creates a toroidal shape; these radii being each limited to a narrow range. The lens has a nose opening with an upper extremity, this upper extremity being positioned at a specified range from the upper edge of the lens. The lens portion passing above the upper extremity is a continuous surface defined by the same vertical and horizontal arcuate axes. JANNARD '550 also allegedly provide ventilation behind the lens, due to the ventilation gap formed between the lower edges of the eye panes and the wearer's face, while providing sufficient space between the eyes and the lens to avoid eyelash contact.

It is also known to provide a molded single plastic lens of non uniform thickness to try to decrease optical distortion.

OBJECTS OF THE INVENTION

The gist of the invention is to provide an eyewear adapted for sporting activities, particularly high-speed ones including cycling and alpine skiing.

An important object of the invention is to provide such an eyewear, incorporating a unitary spherical lens having two lens elements that compensate optical distortion.

Yet another object of the invention is to provide an interchangeable eyewear or lens shaped to confer a maximum aerodynamism to the eyewear and incorporating two integral lens elements each structured to obtain minimum optical distortion.

SUMMARY OF THE INVENTION

Accordingly with the objects of the invention, there is disclosed an unitary flexible sheet lens being substantially spherical, for use with an eyewear frame, said lens defining a substantially spherical outer surface and a first and a second transparent lens element;
wherein each said lens element:
  (a) defines an interior and an exterior spherical surface and a central portion surrounded by an edgewise portion, said interior surface adapted to be in facing register with a wearer's face, said interior and exterior spherical surfaces having a different, respective radius and center of curvature providing said lens element with a thicker central portion and a gradually thinner edgewise portion, thus reducing the associated optical distortion of said lens element; and
  (b) is adapted to register with a corresponding one of the two eyes of a wearer;
said unitary lens including attachment means for releasable operative attachment to said eyewear frame;
whereby said lens elements are substantially optically undistorted.

Preferably, said lens further defines a bridge part spacedly integrally interconnecting said first and second lens elements and a top lip carrying said attachment means adapted to be releasably inserted into a channel formed by said frame, each said lens element comprising an inturned web integrally linking a peripheral portion of said lens element to said lip and to said bridge part, said first and second lens elements being exteriorly offset relative to said lip and said bridge part.

Advantageously, for each said lens element, said interior spherical surface has a center of curvature which is offset away from said lens element relative to the center of curvature of said exterior spherical surface, to allow said central portion to be thicker and said edgewise portion to be gradually thinner while keeping an acceptable overall thickness for structural integrity of said lens element.

Preferably, said lens further defines a symmetry axis intermediate said first and second lens elements, said first and second lens elements having respective centers of curvature which are offset on one side and the other of said symmetry axis.

Advantageously, said attachment means are carried by said lip for releasable operative attachment of said lip within said channel of said frame.

Preferably, said attachment means of said lens to said eyewear frame include a pair of transversely spaced notches, made at the top free edge of said lip; said notches adapted to releasably interlock with complementary lugs protruding within said channel of said eyewear frame.

Advantageously, a top lens recess is formed in the top edge portion of said lip above said bridge part, said top recess enabling transverse bending of said lens about said bridge part for facilitating release of said frame lugs from their said lens top lip notches.

Preferably, said bridge part nose opening defines a pair of downwardly diverging bridge arms whereby a downwardly opening V-shaped notch is formed, said bridge arms being integral with said web.

Advantageously, said bridge part and said transverse lip have a matte finish.

Alternately, the present invention discloses an eyewear for high-speed sporting activities, comprising:
  (a) a rigid arcuate elongated frame, said frame defining a channel member;

(b) an unitary flexible sheet lens being substantially spherical, said lens defining a substantially spherical outer surface and a first and a second transparent lens element;

wherein each said lens element:

defines an interior and an exterior spherical surface and a central portion surrounded by an edgewise portion, said interior surface adapted to be in facing register with a wearer's face, said interior and exterior spherical surfaces having a respective radius and center of curvature different from one another providing said lens element with a thicker central portion and a gradually thinner edgewise portion, thus reducing the associated optical distortion of said lens element; and is adapted to register with a corresponding one of the two eyes of a wearer;

said unitary lens including attachment means for releasable operative attachment of said lens elements to said channel member of said eyewear frame;

said eyewear further including:

(c) a pair of rigid ear stems, to be mounted to said rigid frame; and (d) pivot members, pivotally mounting each ear stem to a corresponding end of said rigid elongated frame, whereby said ear stems are pivotable about a plane generally transverse to said sheet lens;

whereby said lens elements are substantially optically undistorted.

Advantageously, said lens further defines a bridge part spacedly integrally interconnecting said first and second lens elements and a top lip carrying said attachment means adapted to be releasably inserted into said channel, each said lens element including an inturned web integrally linking a peripheral portion of said lens element to said lip and to said bridge part, said first and second lens elements being exteriorly offset relative to said lip and said bridge part.

Advantageously, for each said lens element, said interior spherical surface has a center of curvature which is offset away from said lens element relative to the center of curvature of said exterior spherical surface, to allow said central portion to be thicker and said edgewise portion to be gradually thinner while keeping an acceptable overall thickness for structural integrity of said lens element.

Preferably, said lens defines a symmetry axis intermediate said first and second lens elements, said first and second lens elements having respective centers of curvature which are offset on one side and the other of said symmetry axis.

Advantageously, said attachment means are carried by said lip for releasable operative attachment of said lip within said channel of said frame.

Preferably, said attachment means of said lens to said eyewear frame include a pair of transversely spaced notches, made at the top free edge of said lip; said notches adapted to releasably interlock with complementary lugs protruding within said channel of said eyewear frame.

Advantageously, a top lens recess is formed in the top edge portion of said lip above said bridge part, said top recess enabling transverse bending of said lens about said bridge part for facilitating release of said frame lugs from their said lens top lip notches.

Preferably, said bridge part nose opening defines a pair of downwardly diverging bridge arms whereby a downwardly opening V-shaped notch is formed, said bridge arms being integral with said web.

Advantageously, said bridge part and said transverse lip have a matte finish.

Preferably, said exterior surface of said first and second lens elements and the external surface of said rigid arcuate frame and of said nose piece band form a substantially smooth and aerodynamic outer spherical surface.

DETAILED DESCRIPTION OF THE DRAWINGS

Figure 2:
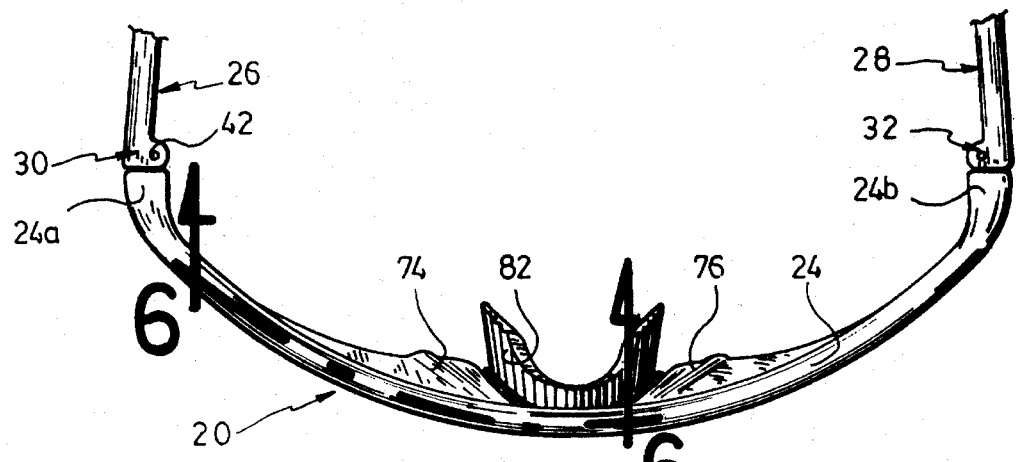
FIG. 2 is a top edge view of the eyeglasses of FIG. 1, with the eye stems being partly broken for clarity of the view.
Figure 1:
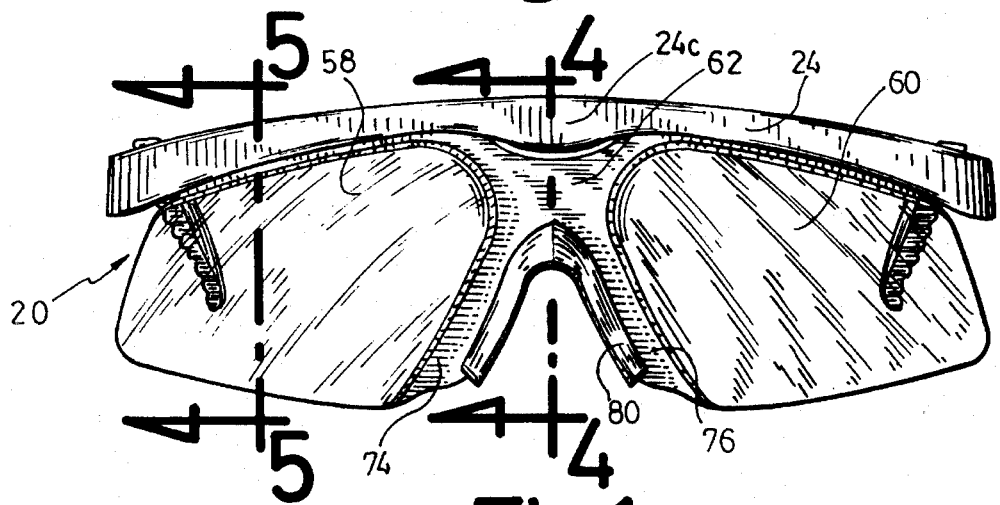
FIG. 1 is a front elevation of eyeglasses according to a first embodiment of the invention.

FIGS. 1–3 and 8 show eyeglasses 20 consisting essentially of a single lens or pane 22, an elongated arcuate frame 24 carried about the top lip of lens 22, and a pair of ear stem members 26 and 28 pivotally carried to the opposite ends of elongated frame 24 about pivot members 30 and 32. Frame 24 is arcuate both in front elevational view (FIG. 1) and in top edge view (FIG. 2). The opposite end portions of frame 24 are interiorly elbowed, at 24a, 24b.

Figure 4:
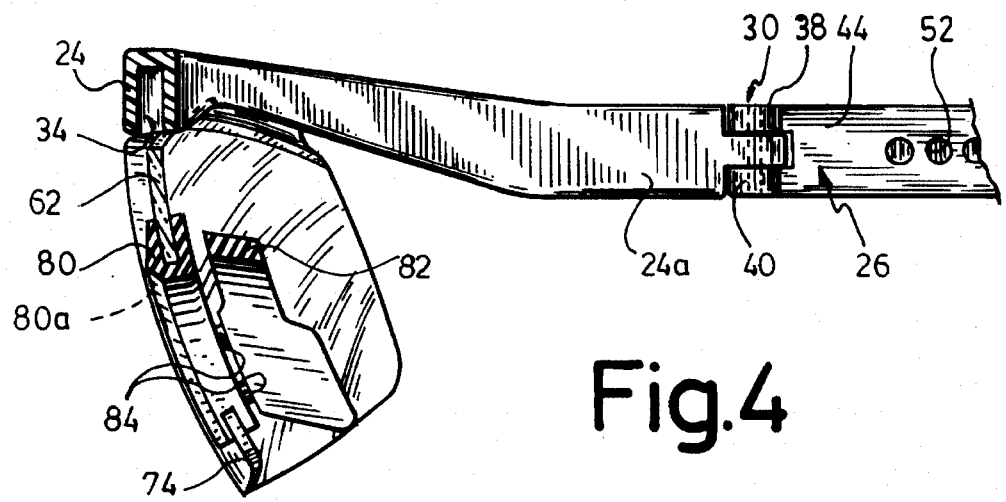
FIGS. 4 and 5 are enlarged cross-sectional views taken along lines 4—4 and 5—5 respectively of FIG. 1, showing the eye stems partly broken for clarity of the views.
Figure 5:
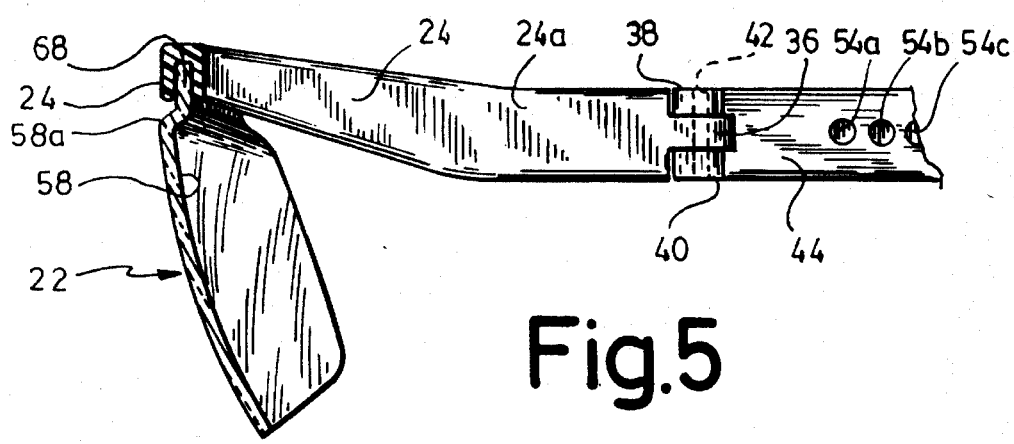

As illustrated in FIGS. 4 and 5, frame 24 forms a downwardly opening channel 34 for edgewisely receiving the top lip of the single lens 22; preferably, channel 34 is cross-sectionally U-shaped, as illustrated. Each pivot member 30, 32, pivots the corresponding ear stem 26, 28 relative to the frame 24 about a plane generally transverse to the single lens 22. Pivot members 30, 32, may be of any known suitable design, e.g. a piano hinge as illustrated. Hence, for piano hinge pivot member 30 shown in FIGS. 4–5, there is included an intermediate ear 36, endwisely projecting from frame elbow 24a, and two top and bottom ears 38, 40, endwisely projecting from the ear stem 26, whereby the transverse gap formed between ears 38, 40, is complementary to ear 36 for friction fit engagement therein. A pivot pin 42 extends through the triplet of registering ears 36, 38, 40, for pivotal interconnection thereof. Frame 24 is made from a rigid material, e.g. a rigid plastic.

Figure 3:
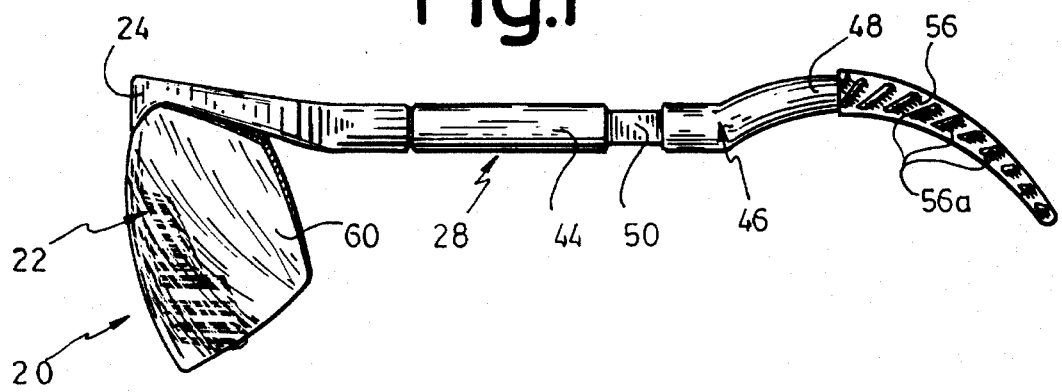
FIG. 3 is a side elevational view of said eyeglasses.

Preferably, and as suggested in FIGS. 3, 4 and 5 of the drawings, each ear stem 26 and 28 is telescopingly extensible. Each ear stem may thus include an inner channel portion 44, integral to ears 38 and 40 and defining an inner axial cavity, and an outer portion 46 defining an arcuate free end leg portion 48, for engagement around the ears of a wearer, and an inner shaft 50, of smaller cross-section relative to arcuate leg portion 48 and for through axial sliding engagement into the axial cavity of the inner channel portion 44. Ear stem leg 48 tapers toward its free end tip, as shown. Ear stems 26, 28, should be made from a rigid material, e.g. a rigid plastic material.

Preferably, means are provided to releasably lock the outer portion 50 into the inner portion 44 of the ear stem 26, 28, in a partially engaged condition. Such lock means could be for example a friction fit interlock. Alternately, such lock means could include a thin lug 52, transversely integrally carried by the inner shaft 50, and a number of bores 54a, 54b, 54c, ... made in axially spaced fashion about the inner face (FIGS. 4–5) of the inner channel portion 44. Lug 52 and bores 54a, 54b, ... being complementary to one another, the engagement of lug 52 into a selected one of the bores 54a, 54b, ... frictionally interlock the inner and outer leg portions 44 and 46 of the ear stem 26, 28, at a partially extended condition of the outer leg portion 46.

Preferably also, the free end portion of ear stem leg 48 is frictionally engaged by a soft sleeve boot 56 (FIG. 3) of a shape conforming to that of leg 48. Sleeve boot 56 would advantageously be made from an elastomeric material, for example from silicon rubber, rubber or thermoplastic elastomer (TPE). Sleeve boot 56 still may include a number of lateral winglets 56a, to provide a better grip with the wearer's ear.

FIGS. 7–10 best show the structural features of the unitary lens 22 forming part of the eyeglasses of the invention. Unitary lens 22 is made of a transparent molded plastic pane sufficiently thin to be flexible. It includes a pair of lens elements 58, 60, which are integrally interconnected by a bridge part 62. Each lens element 58, 60 has an inner and an outer surface which each forms a smooth spherical shape, i.e. an arcuate shape about both horizontal and vertical axes with equal radii of curvature, whereas bridge part 62 has a substantially straight horizontal cross-section so as to interrupt the continuity of the spherical surface formed by the lens elements 58 and 60.

As shown in FIGS. 7 to 10, each lens element 58, 60, most preferably has a generally quadrangular shape, but with the corners being rounded. The top edge of each lens element 58, 60 is extended by an inturned top web 58a, 60a which joins with a coextensive lip 68, 70, respectively. The inner side edge portion of each lens element 58, 60 is extended by an inturned inner side web 58d, 60d which joins with bridge part 62 and with bridge arms 74, 76 which downwardly depend from bridge part 62 on each side of a V-shaped nose-receiving notch 78. Top web 58a and inner side web 58d smoothly join around the rounded top inner corner of lens element 58. The same joint is formed between webs 60a and 60d of lens element 60. Each lens element 58, 60 further has a free bottom edge 58b, 60b and a free outer side edge 58c, 60c. The two lips 68, 70 are curved both vertically and horizontally while bridge part 62, while horizontally straight, is curved vertically. Bridge arms 74, 76 have the same vertical curve as bridge part 62 and are extensions of the latter. Each lens element 58, 60, is thus outwardly offset (i.e. away from the wearer's face) relative to bridge part 62, bridge arms 74, 76 and lips 68 and 70. Lips 68, 70 releasably engage into the axial U-channel 34 of frame 24.

This outward offset issued from inturned top and inner webs 58a, 58d and 60a, 60d is very advantageous for the wearer's eye. Indeed, each inturned web allows the corresponding lens element to be positioned further away from the wearer's eyes. First of all, this prevents undesirable eyelash lens contact for the wearer, while lips 68, 70 and bridge part 62 and therefore frame 34 remain closer to the wearer's face to control undesirable air flow behind eyeglasses 20 by setting a barrier that deflects transversely incoming air. Secondly and most importantly, the fact that the lens elements are positioned further away from the face of the user allows the use of less curved lens elements, and therefore the effective length of the radii of curvature of the lens elements can be lengthened to reduce the optical compensation needed to overcome the optical distortion associated with shorter radii lenses.

Figure 6:
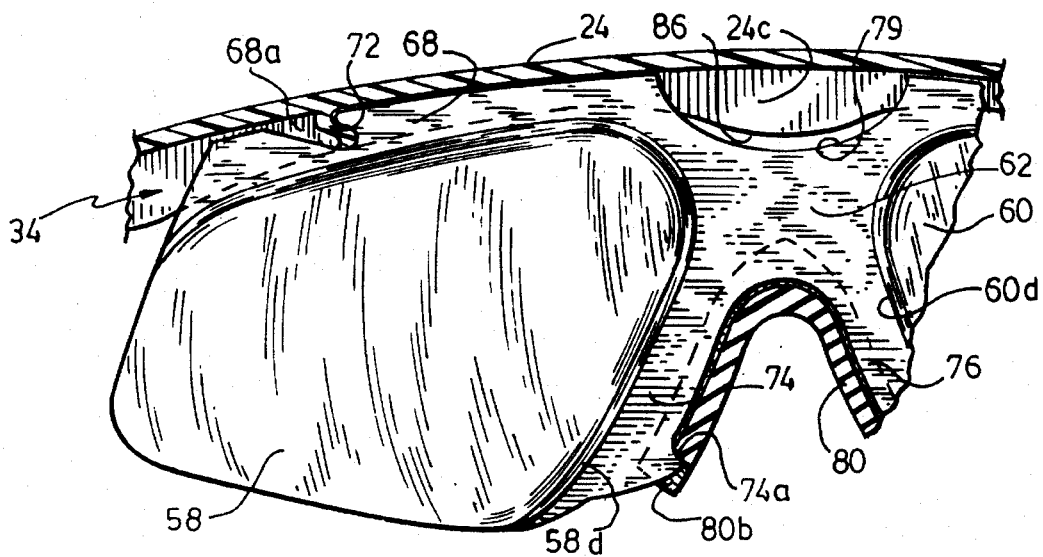
FIG. 6 is a sectional view at an enlarged scale taken along curved line 6—6 of FIG. 2.
Figure 7:
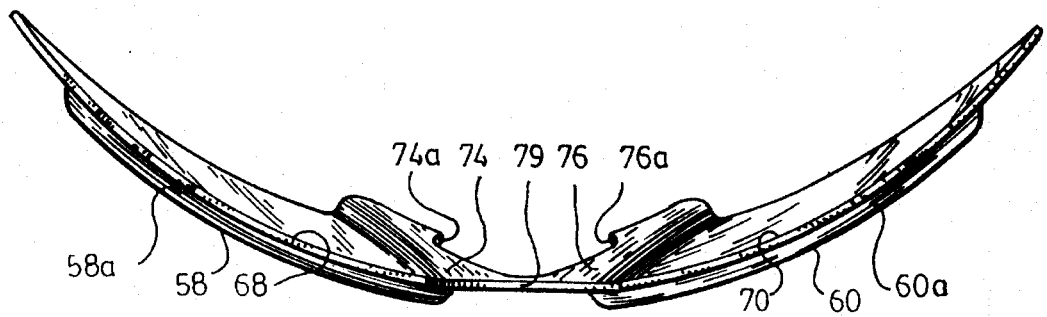
FIG. 7 is a top edge view of the single lens forming part of said eyeglasses.
Figure 8:
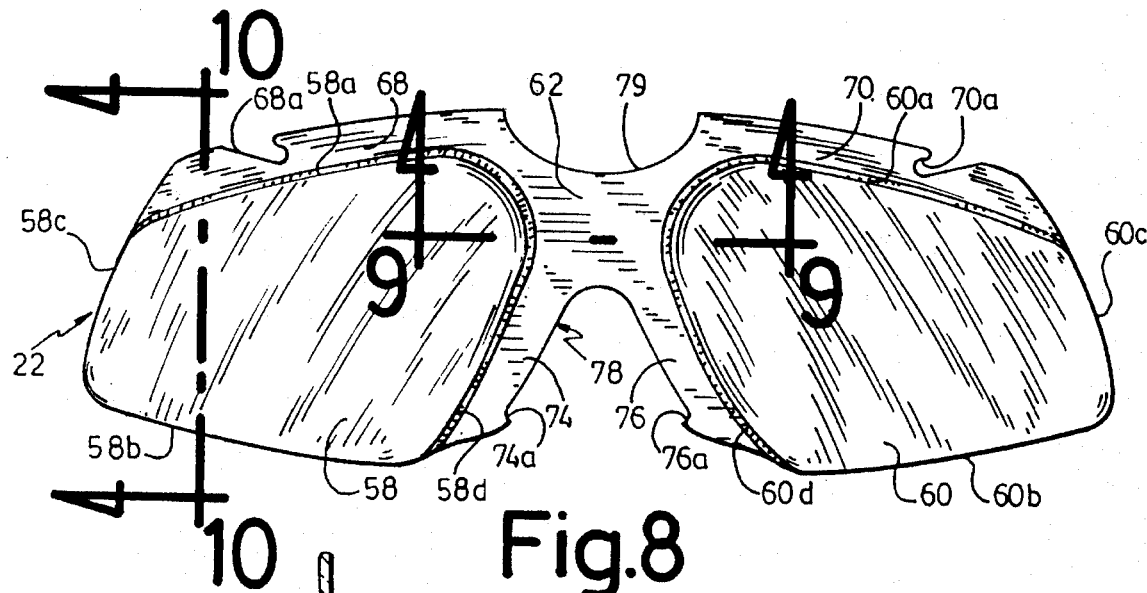
FIG. 8 is a front elevational view of said single lens of the eyeglasses.
Figures 9, 10:
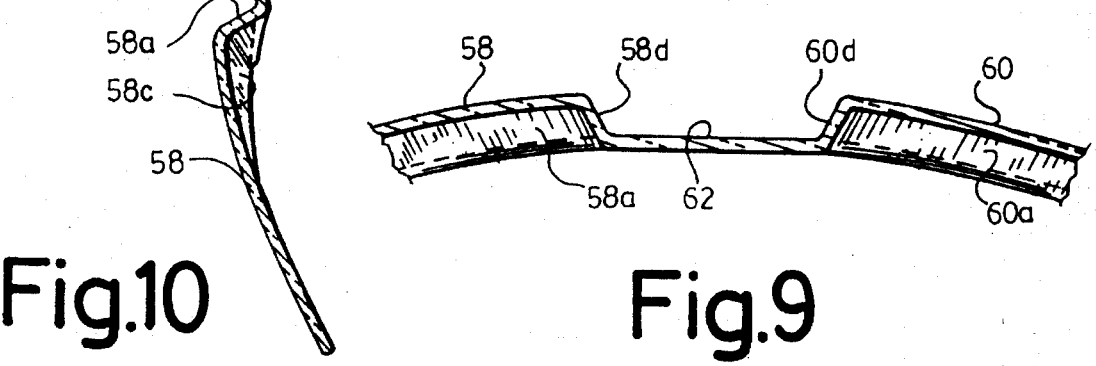
FIGS. 9 and 10 are cross-sectional views at an enlarged scale taken along lines 9—9 and 10—10 respectively of FIG. 8.

Means are provided for releasably interlocking lips 68 and 70 into the frame axial U-channel 34. Preferably, such interlocking means includes a notch 68a, 70a, projecting obliquely in an upwardly outward direction (FIG. 8). Each notch 68a, 70a, is lockingly engageable in a releasable fashion by a complementary lug 72, 72 (FIG. 6), carried transversely within the frame channel 34 integral to the body of frame 24. Since the notches 68a and 70a are oriented in opposite direction, the lugs 72, 72, are well anchored therein and they cannot easily be removed therefrom.

Means for enabling installation of, and for facilitating release of lugs 72 from notches 68a, 70a, are also provided, and will be detailed later.

As previously noted, bridge arms 74 and 76 are interiorly offset from the general spherical surface of lens elements 58 and 60 respectively and merge with the top edge lips 68 and 70 and with bridge part 62. A shallow semi-circular notch 79 is formed in the top of bridge part 62, between top lips 68 and 70.

A nose piece of soft, elastomeric material (e.g. rubber, silicon rubber or TPE material), is removably fitted within notch 78. As shown in FIG. 4, this nose piece, of known construction, is formed of an angle strip 80 and of a nose pad 82. Strip 80 has a cross-sectionally U-shaped channel 80a, for frictional interlocking engagement by lips 74, 76, respectively. Nose pad 82 is pivotally carried by strip 80 interiorly thereof (i.e. toward the wearer's nose) via a pair of pad support arms 84. Nose pad 82 is adapted to directly engage against the sides of the wearer's nose.

To retain in place strip 80 against accidental falling down from lips 74 and 76, there is preferably provided a step 74a, 76a (FIGS. 6 and 8) at the lower edge portion of each lip 74 and 76. Each step 74a, 76a, forms a seat for abutting engagement into a notch 80b, 80b, respectively, made at each of the corresponding opposite ends of the elongated strip 80. Strip 80 can be manually released from V-recess 78, simply by forcibly pulling both ends of the strip 80 toward each other and away from the respective lips 74 and 76, against the resiliency of the strip material.

A preferred embodiment of the release means for releasing the lens lugs 72, 72, from their frame notches 68a, 70a, will now be detailed. Lens U-frame 24 further includes a central downwardly convex widened portion 24c (FIG. 6), made for an aesthetic purpose and adapted to come in register with the single lens intermediate semi-circular recess 79. The width (or height) of convex frame portion 24c must be smaller than the depth (or height) of semi-circular recess 79, as suggested in FIG. 6, so that an arcuate gap 86 be normally formed therebetween, in the unbiased condition of lens 22. The user's fingernail can be inserted into gap 86 to facilitate pulling of lens 22 away from frame portion 24c in order to disengage lugs 72, 72 from frame notches 68a, 70a.

U-channel 34 of frame 24 engages lens 22 in a rearwardly offset position, relative to lens elements 58, 60, because of rearwardly-located lips 68, 70. Nose strip 80 is also centered on rearwardly located lips 74, 76. Thus, as suggested in FIGS. 3–5 and 14, eyeglasses 20 define a substantially smooth front outer surface consisting of the exterior surfaces of spherical lens elements 58, 60, frame 24 and strip 80. This aerodynamic and smooth front surface has a significant importance at high bicycle-riding speed.

Advantageously, lens 22 has a matte or opaque finish on its outer front surface, except for the surface of lens elements 58, 60. This matte or opaque finish is especially important on bridge part 62 and on lips 74, 76. The purpose of this finish is to mask non-optical areas which may contribute to eye strain due to optical distorsion when looking through those areas.

Figure 13:
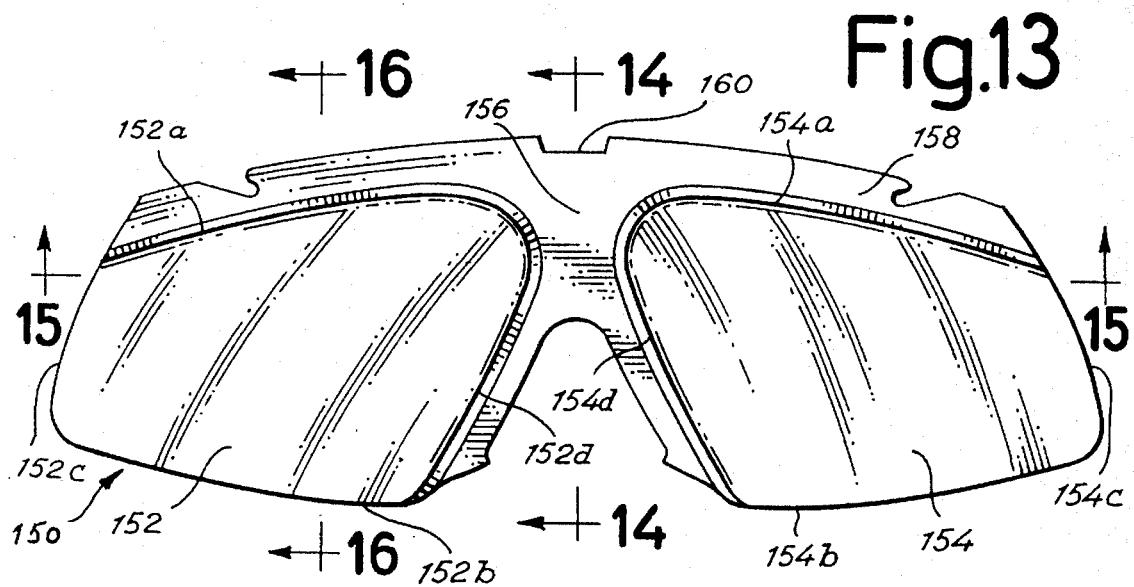
FIG. 13 is a front elevation of a second and preferred embodiment of the lens of the invention.

FIG. 13 shows a preferred embodiment of the lens of the invention. A unitary lens 150 is similar to unitary lens 22 of the first embodiment. Unitary lens 150 comprises a pair of lens elements 152 and 154 defining respective top, bottom, outer and inner side edges 152a to 152d and 154a to 154d. The top and inner side edges 152a, 152d and 154a, 154d each define an inturned web, as in the first embodiment, that integrally link both lens elements with an inwardly offset bridge part 156 and a single upper lip 158.

The first difference between the two lenses 150 and 22 is that bridge part 156 is narrower than bridge part 62 of the first embodiment. Lens elements 152 and 154 are proportionally wider, and thus the field of view of each lens element 152, 154 is enhanced.

A second difference between the first and second embodiment is that the center opening 160 on the top lip 158 of lens 150 is much smaller than recess 79. Indeed, opening 160 is destined to be covered completely by the frame 162, as suggested in FIG. 14, it's purpose being solely to enable a transverse bending of lens 150 about bridge part 156 for facilitating the release of the lens 150 from the frame U-shaped channel. Opening 160 thus forms a notch in upper lip 158, which is not divided in two distinct lips as in the first embodiment.

Other than these two differences, both lenses 22 and 150 are very similar.

Both lenses 22 and 150 have to deal with the optical distortion phenomenon. It will hereafter be explained how lens 150 is shaped to do so, but it is understood that lens 22 is similarly shaped.

Figure 11:
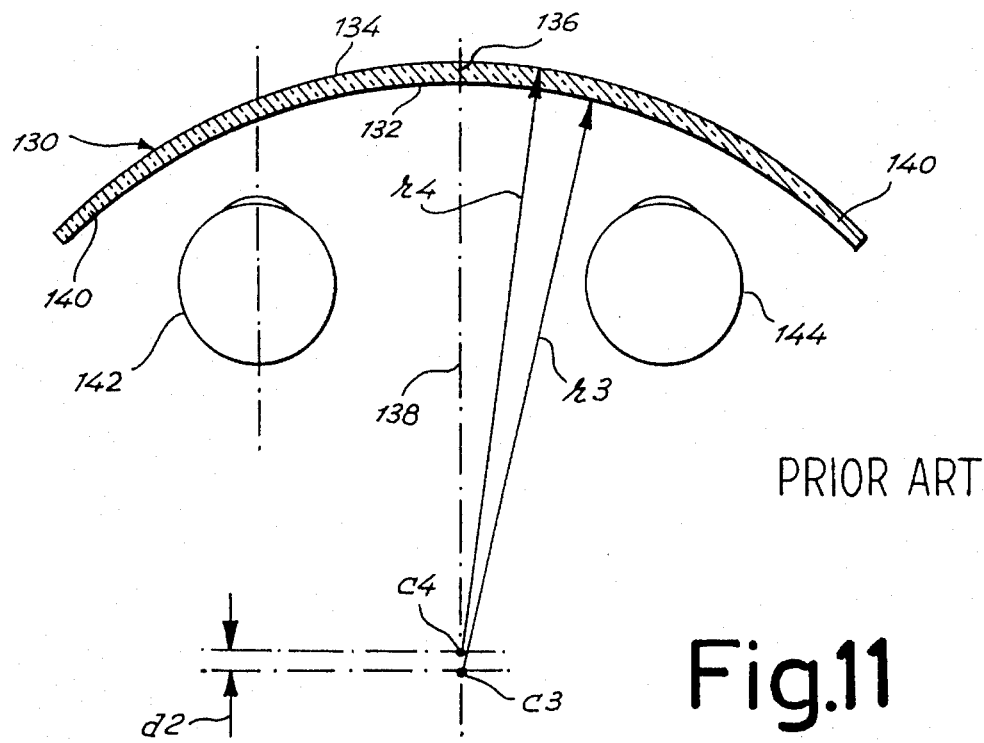
FIG. 11 is a schematic top cross-sectional view of a prior art single lens, showing two eyes as they would be positioned relative to the lens, when the latter's eyewear is worn.
Figure 12:
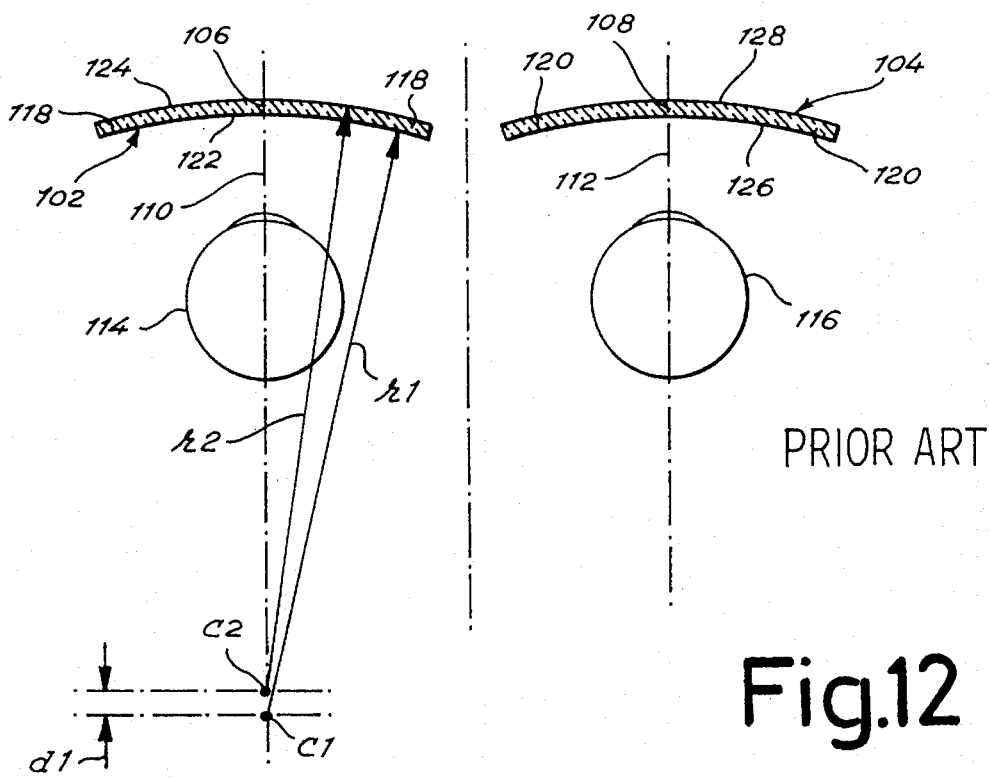
FIG. 12 is similar to FIG. 11, but the prior art eyewear comprises two independent lenses instead of a single one.

FIGS. 11 and 12 of the annexed drawings show conventional prior art eyewear lenses. FIG. 11 illustrates more specifically a single lens like the one disclosed in JANNARD '550. The eyewear of FIG. 12 includes two independent lenses.

A plastic lens having a non-zero and non-infinite radius of curvature produces, because of its non-zero refractive index, an optical distortion for a person looking through such a curved plastic lens. This optical distortion can be corrected by means of optical compensation, which consists in varying the thickness of the curved lens so that said lens be thickest in its center portion and gradually thinner towards its edgewise portion.

In the case of two independent lenses, as in FIG. 12, it is known to provide an individual optical compensation for each lens 102 and 104. Thus, each lens 102 and 104 is thicker in its center portion 106, 108, in register with a forwardly-oriented central axis 110, 112 of eyes 114, 116, than on its edgewise portion 118, 120. The increased thickness is conferred, e.g. to lens 102, by providing to the interior and exterior walls 122 and 124:

1) respective centers of curvature $C_1$ and $C_2$ which are offset from one another along central axis 110, of a distance $d_1$; and 2) a greater radius of curvature $r_1$ to interior wall 122 than radius of curvature $r_2$ to exterior wall 124; since offset $d_1$ exists, lens 102 remains thick enough near its edgewise portion 118.

Lens 104 is a mirror image of lens 102, and thus also has different radii of curvature corresponding to its interior and exterior walls 126, 128.

This individual optical compensation allows the wearer of eyeglasses equipped with lenses 102, 104 to circumvent the optical distortion brought about by the curved plastic lenses.

Single lens eyewear, such as disclosed in JANNARD '550 and as shown in FIG. 11, has global optical compensation. Indeed, the lens 130 defines interior and exterior walls 132, 134 which have respective centers of curvature $C_3$, $C_4$ offset of a distance $d_2$ from each other and respective radii of curvature $r_3$, $r_4$, with $r_3$ being greater than $r_4$. Therefore, lens 130 is thicker in its mid portion 136, in register with an axis of symmetry 138, than on its edgewise portion 140, and consequently defines a global optical compensation.

Global optical compensation would most benefit a person looking through lens 130 in alignment relationship with axis of symmetry 138, and is therefore not optimized when used by a person having eyes 142, 144 spaced from axis 138.

Figure 15:
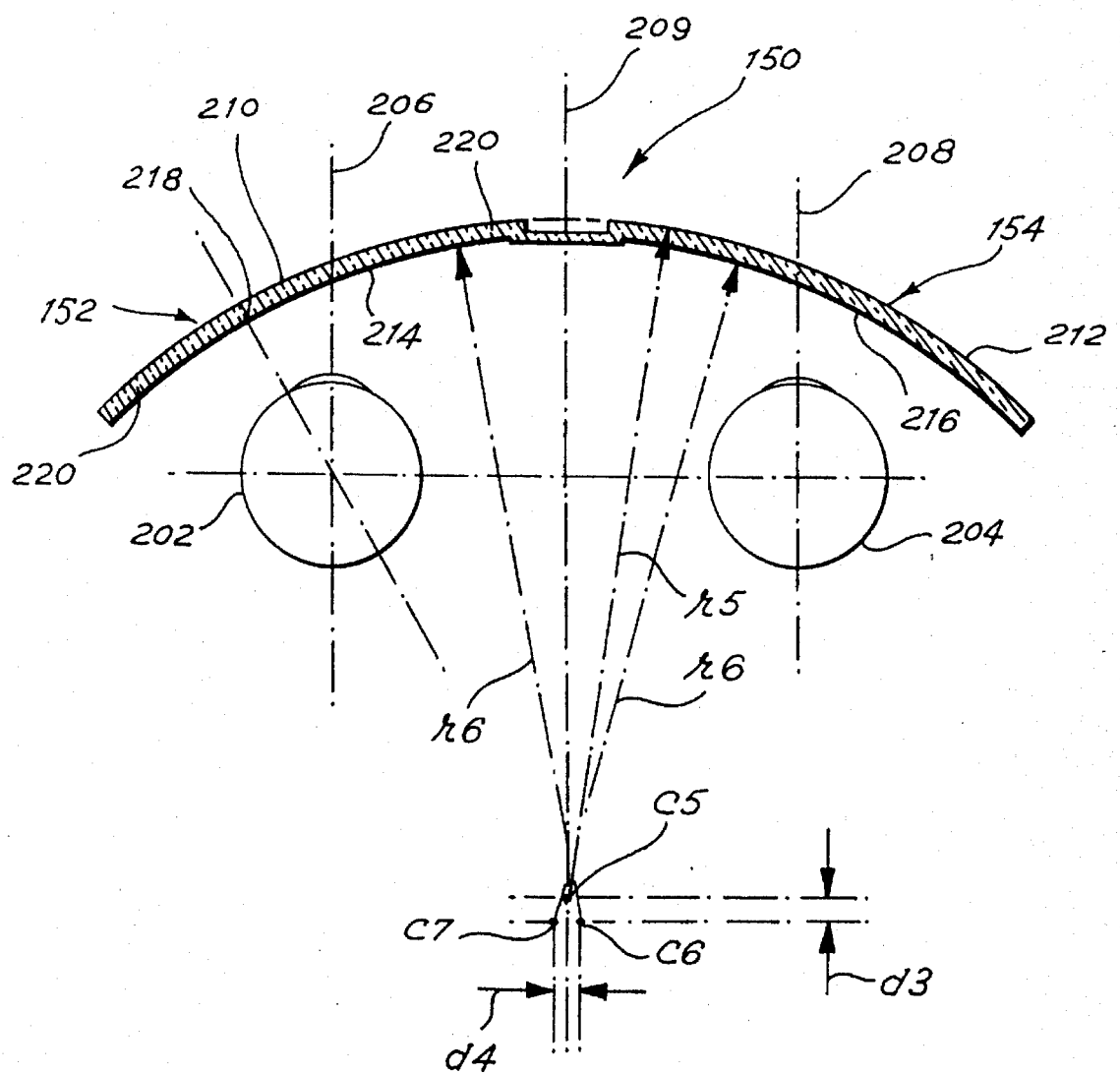

FIG. 15 schematically shows two eyes 202, 204 of a wearer, each eye 202, 204 defining a forwardly-oriented central axis 206, 208 symmetrically positioned on one side and the other of an axis of symmetry 209. Each lens element 152, 154 of the lens 150 of the present invention is positioned to register with the field of view of its corresponding eye 202, 204. Moreover, single lens 150 defines individual optical compensation.

Figure 16:
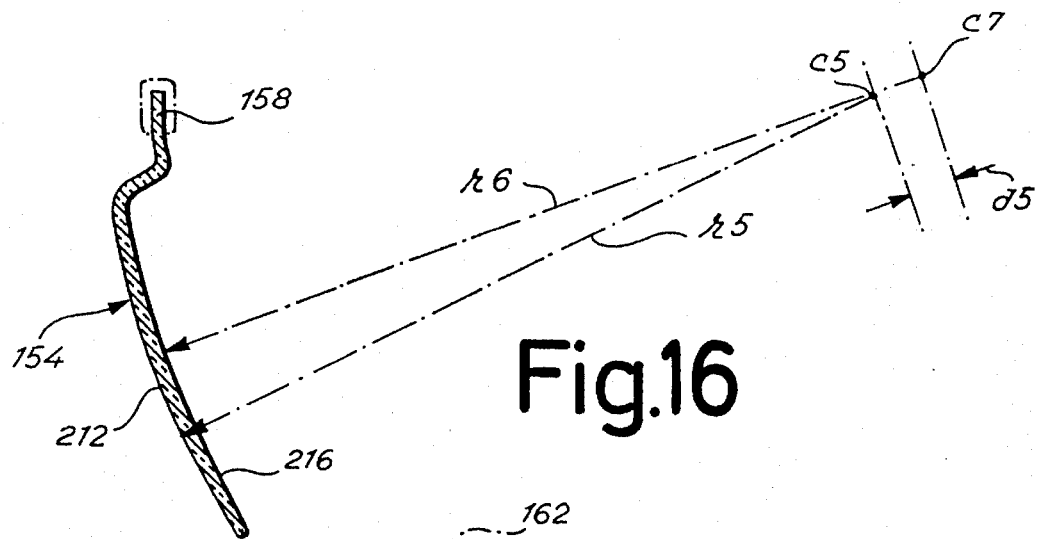
FIGS. 15 and 16 are schematic cross-sectional views taken along lines 15—15 and 16—16, respectively, of FIG. 13.
Figure 14:
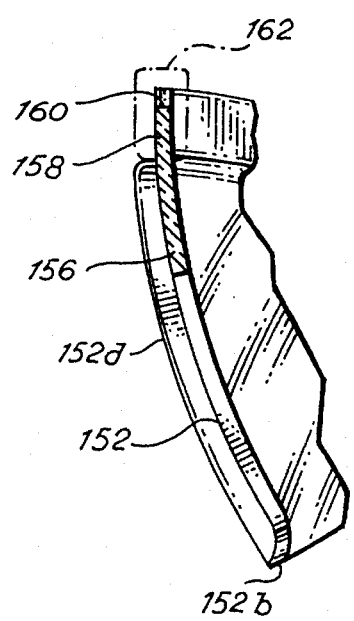
FIG. 14 is a cross-sectional view taken along line 14—14 of FIG. 13.

FIGS. 15 and 16 show that lens elements 152, 154 comprise respective exterior surfaces 210, 212 with a same center of curvature $C_5$ and a same radius of curvature $r_5$. Each lens element 152, 154 further defines an interior surface 214, 216 having a respective center of curvature $C_6$, $C_7$ and a same radius of curvature $r_6$, the latter being greater than outer surface radius $r_5$. As shown in FIG. 15, centers $C_6$ and $C_7$ are offset along axis of symmetry 209 of a distance $d_3$ and are also offset on one side and the other of axis 209 of a distance $d_4/2$. Moreover, as shown in FIG. 16, center $C_7$ is vertically offset of a distance $d_5$ with respect to center $C_5$. Offsets $d_3$, $d_4/2$ and $d_5$ and the radius of curvature ratio $r_5/r_6$ allow each lens element, e.g. lens element 152, to:

1) be thicker at a central portion 218 and gradually thinner towards its edgewise portion 220; and 2) keep an acceptable overall thickness for structural integrity, even though the inner radius of curvature is greater than the outer one.

Lens element 154 is a mirror image, relative to symmetry axis 209, of lens element 152.

Therefore, single lens 150 confers an individual optical compensation by means of both lens elements 152, 154, and the optical distortion resulting from the curved plastic lens is reduced significantly. The individual optical compensation resembles the one found on conventional double-lens eyewear (e.g. prior art FIG. 12), but it is found on the single lens 150 of the invention.

It is important that the exterior surfaces 210, 212 of lens elements 152, 154 have a same radius and center of curvature $r_5$ and $C_5$, to confer a smooth and aerodynamic outer surface to lens 150.

This unitary spherical lens eyewear is particularly suited for sportsmen engaging into high speed sporting activities, such as cycling and alpine skiing, although other similar activities are not excluded from the scope of the invention. The unitary spherical lens should include two lens elements 58 and 60, each being transparent for enabling through-vision by the wearer's eyes.

I claim:

1. A unitary flexible transparent eyewear pane being substantially spherical, for use with an eyewear frame, said pane defining a substantially spherical outer surface having a center and a radius of curvature, said pane further defining a first and a second transparent lens elements;

wherein each said lens element defines an interior and an exterior spherical surface, the exterior surface of each said lens element being a portion of said pane outer spherical surface, each said lens element further defining a central portion surrounded by an edgewise portion, said interior surface adapted to be in facing register with one eye of a wearer's face;

said first and second lens elements interior spherical surfaces having;

respective centers of curvature equally laterally offset on opposite sides of said pane outer surface center of curvature and offset away from said pane outer surface center of curvature relative to said pane; and an equal radius of curvature which is greater than said pane outer surface radius of curvature;

each said lens element having a thicker central portion and a gradually thinner edgewise portion, conferring optical compensation to said lens element while keeping a sufficiently large overall thickness for maintaining structural integrity thereof, wherein each said lens element is substantially undistorted;

said pane including attachment means for releasable operative attachment to the eyewear frame.

2. An unitary transparent pane as defined in claim 1, further defining a bridge part spacedly integrally interconnecting said first and second lens elements and a top lip carrying said attachment means adapted to be releasably inserted into a channel formed by said frame, each said lens element comprising an inturned web integrally linking a peripheral portion of said lens element to said lip and to said bridge part, said first and second lens elements being exteriorly offset relative to said lip and said bridge part.

3. A unitary transparent pane as defined in claim 2, wherein said attachment means are carried by said lip for releasable operative attachment of said lip within the channel of the frame.

4. A unitary transparent pane as defined in claim 3, wherein said attachment means of said lens to the eyewear frame include a pair of transversely spaced notches, made at the top free edge of said lip; said notches adapted to releasably interlock with complementary lugs protruding within the channel of the eyewear frame.

5. A unitary transparent pane as defined in claim 4, wherein a top lens recess is formed in the top edge portion of said lip above said bridge part, said top recess enabling transverse bending of said lens about said bridge part for facilitating release of the frame lugs from their said lens top lip notches.

6. A unitary transparent pane as defined in claim 5, wherein said bridge part nose opening defines a pair of downwardly diverging bridge arms whereby a downwardly opening V-shaped notch is formed, said bridge arms being integral with said web.

7. A unitary lens as defined in claim 6, wherein said bridge part and said transverse lip have a matte finish.

8. An eyewear for high-speed sporting activities, comprising:

(a) a rigid arcuate elongated frame, said frame defining a channel member;

(b) an unitary flexible transparent eyewear pane being substantially spherical, said pane defining a substantially spherical outer surface having a center and a radius of curvature, said pane further defining a first and a second transparent lens elements;

wherein each said lens element defines an interior and an exterior spherical surface, the exterior surface of each said lens element being a portion of said pane outer spherical surface, each said lens element further defining a central portion surrounded by an edgewise portion, said interior surface adapted to be in facing register with one eye of a wearer's face; said first and second lens elements interior spherical surfaces having:

respective centers of curvature equally laterally offset on opposite sides of said pane outer surface center of curvature and offset away from said pane outer surface center of curvature relative to said pane; and an equal radius of curvature which is greater than said pane outer surface radius of curvature;

each said lens element having a thicker central portion and a gradually thinner edgewise portion, conferring optical compensation to said lens element while keeping a sufficiently large overall thickness for structural integrity thereof, each said lens element consequently being substantially optically undistorted;

said pane including attachment means for releasable operative attachment to said channel member of said eyewear frame; said eyewear further including:

(c) a pair of rigid ear stems, to be mounted to said rigid frame; and (d) pivot members, pivotally mounting each ear stem to a corresponding end of said rigid elongated frame, said ear stems being pivotable about a plane generally transverse to said pane.

9. An eyewear as defined in claim 8, wherein said pane defines a bridge part spacedly integrally interconnecting said first and second lens elements and a top lip carrying said attachment means adapted to be releasably inserted into said channel, each said lens element including an inturned web integrally linking a peripheral portion of said lens element to said lip and to said bridge part, said first and second lens elements being exteriorly offset relative to said lip and said bridge part.

10. An eyewear as defined in claim 9, wherein said attachment means are carried by said lip for releasable operative attachment of said lip within said channel of said frame.

11. An eyewear as defined in claim 10, wherein said attachment means of said pane to said eyewear frame include a pair of transversely spaced notches, made at the top free edge of said lip; said notches adapted to releasably interlock with complementary lugs protruding within said channel of said eyewear frame.

12. An eyewear as defined in claim 11, wherein a top pane recess is formed in the top edge portion of said lip above said bridge part, said top recess enabling transverse bending of said pane about said bridge part for facilitating release of said frame lugs from their said pane top lip notches.

13. An eyewear as defined in claim 12, wherein said bridge part nose opening defines a pair of downwardly diverging bridge arms whereby a downwardly opening V-shaped notch is formed, said bridge arms being integral with said web.

14. An eyewear as defined in claim 13, wherein said bridge part and said transverse lip have a matte finish.

15. An eyewear as defined in claim 10, wherein said exterior surface of said first and second lens elements and the external surface of said rigid arcuate frame and of said nose piece band form a substantially smooth and aerodynamic outer spherical surface.

* * * * *